US008069821B1

(12) United States Patent
Green

(10) Patent No.: US 8,069,821 B1
(45) Date of Patent: Dec. 6, 2011

(54) ANIMAL BATHING APPARATUS

(76) Inventor: Giles D. Green, Florissant, MO (US)

( * ) Notice: Subject to any disclaimer, the term of this patent is extended or adjusted under 35 U.S.C. 154(b) by 4 days.

(21) Appl. No.: 12/837,786

(22) Filed: Jul. 16, 2010

(51) Int. Cl.
*A01K 13/00* (2006.01)

(52) U.S. Cl. ........................................ 119/671; 119/673

(58) Field of Classification Search .................. 119/600, 119/602, 601, 603, 604, 650, 651, 652, 665, 119/668, 671, 673, 674, 676; D30/158; 4/585, 4/587
See application file for complete search history.

(56) References Cited

U.S. PATENT DOCUMENTS

| | | | | |
|---|---|---|---|---|
| 3,112,498 A | * | 12/1963 | Hoffman | 4/585 |
| 4,057,032 A | * | 11/1977 | Dimitriadis | 119/671 |
| 5,193,487 A | * | 3/1993 | Vogel | 119/671 |
| 5,213,064 A | * | 5/1993 | Mondine et al. | 119/671 |
| 5,259,339 A | * | 11/1993 | McLaughlin | 119/676 |
| 5,662,069 A | | 9/1997 | Smith | |
| 5,678,511 A | * | 10/1997 | Day | 119/676 |
| 5,711,252 A | | 1/1998 | Brandolino | |
| 5,794,570 A | * | 8/1998 | Foster et al. | 119/756 |
| D404,853 S | | 1/1999 | Foster et al. | |
| 6,516,752 B2 | * | 2/2003 | Batterton | 119/650 |
| 6,988,467 B1 | | 1/2006 | Smith | |
| 7,107,937 B1 | * | 9/2006 | Anderson | 119/671 |
| 2003/0196608 A1 | * | 10/2003 | Lee | 119/651 |
| 2006/0102097 A1 | * | 5/2006 | Price | 119/671 |
| 2007/0039559 A1 | | 2/2007 | Foster | |
| 2007/0289548 A1 | * | 12/2007 | Smoot | 119/668 |
| 2011/0083613 A1 | * | 4/2011 | Redick | 119/671 |

* cited by examiner

*Primary Examiner* — T. Nguyen
(74) *Attorney, Agent, or Firm* — Crossley Patent Law; Mark A. Crossley

(57) ABSTRACT

The animal bathing apparatus is fully portable and enclosed by its base and hingedly attached case that overlappingly fits atop the base. Other components, when collapsed, fit within and above the base. The folding legs of the apparatus provide for an animal tender to reach within the front round edged cutout to bath an animal while either sitting upon a given chair or standing, without having to bend. An animal is adjustably tethered within the expanded apparatus so that hands of a tender are free for use in bathing. The water dispenser is mounted on a flexible neck and is height adjustable. The ideally rectangular base has an elevated border, with walls that may be transparent.

10 Claims, 6 Drawing Sheets

US 8,069,821 B1

ANIMAL BATHING APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Animal bathing is ubiquitous, as are the problems associated with such. It is well accepted that bathing an animal in a human bathroom in a tub or shower is fraught with problems. Simply squatting next to an animal, holding a water hose, and dealing with the typical ensuing struggle is less than desirable. Animal bathing devices have therefore been presented. Of the animal bath devices previously presented, those with easy portability are most desirable. However, a superior animal bath apparatus should provide other advantages. The present apparatus provides an accumulation of advantages not heretofore provided in an animal bathing apparatus.

FIELD OF THE INVENTION

The animal bathing apparatus relates to animal bathing apparatus and more especially to one that provides a portable, self-encased elevated, collapsible animal bathing apparatus.

SUMMARY OF THE INVENTION

The general purpose of the animal bathing apparatus, described subsequently in greater detail, is to provide an animal bathing apparatus which has many novel features that result in an improved animal bathing apparatus which is not anticipated, rendered obvious, suggested, or even implied by prior art, either alone or in combination thereof.

To attain this, the animal bathing apparatus is fully portable and enclosed by its base and hingedly attached case that overlappingly fits atop the base. Other components, when collapsed, fit within and above the base. The folding legs of the apparatus provide for an animal tender to reach within the front round edged cutout to bath an animal while either sitting upon a given chair or standing, without having to bend. Importantly, an animal is adjustably tethered within the expanded apparatus so that hands of a tender are free for use in bathing. Additionally, the water dispenser is height adjustable and is presented on a flexible neck. The ideally rectangular base has an elevated border, with walls that may be transparent. Further, the walls may be easily clipped to and unclipped from the extendable supports that are hingedly attached to the rounded corners of the base. Any number of a plurality of c-clips may be attached to walls. The walls may be flexible, rigid, transparent, or opaque.

The hose connection provides for easily and removably attaching a water source to the base. Water is drained from the base by the drain, and influenced to drain by the pitched base bottom slanted toward the drain with removable screen.

Thus has been broadly outlined the more important features of the improved animal bathing apparatus so that the detailed description thereof that follows may be better understood and in order that the present contribution to the art may be better appreciated.

An object of the animal bathing apparatus is to provide for bathing an animal in an enclosed device.

Another object of the animal bathing apparatus is to provide for drainage of the animal's bath water.

And, another object of the animal bathing apparatus is to negate drain clogging from animal hair.

A further object of the animal bathing apparatus is to prevent splash from the enclosed device.

An added object of the animal bathing apparatus is to provide for attendant access to the animal, without the attendant bending.

Another object of the animal bathing apparatus is to be collapsible.

Another object of the animal bathing apparatus is to be collapsible within an attached carry case.

Another object of the animal bathing apparatus is to provide for bathing an animal without having to manually hold the animal.

Another object of the animal bathing apparatus is to provide for pressurized water hookup.

Another object of the animal bathing apparatus is to provide for selective water delivery direction.

These together with additional objects, features and advantages of the improved animal bathing apparatus will be readily apparent to those of ordinary skill in the art upon reading the following detailed description of presently preferred, but nonetheless illustrative, embodiments of the improved animal bathing apparatus when taken in conjunction with the accompanying drawings.

In this respect, before explaining the current embodiments of the improved animal bathing apparatus in detail, it is to be understood that the animal bathing apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved animal bathing apparatus. It is therefore important that the claims be regarded as including such equivalent constructions insofar as they do not depart from the spirit and scope of the animal bathing apparatus.

It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the animal bathing apparatus generally designated by the reference number 10 will be described.

Figure 1:
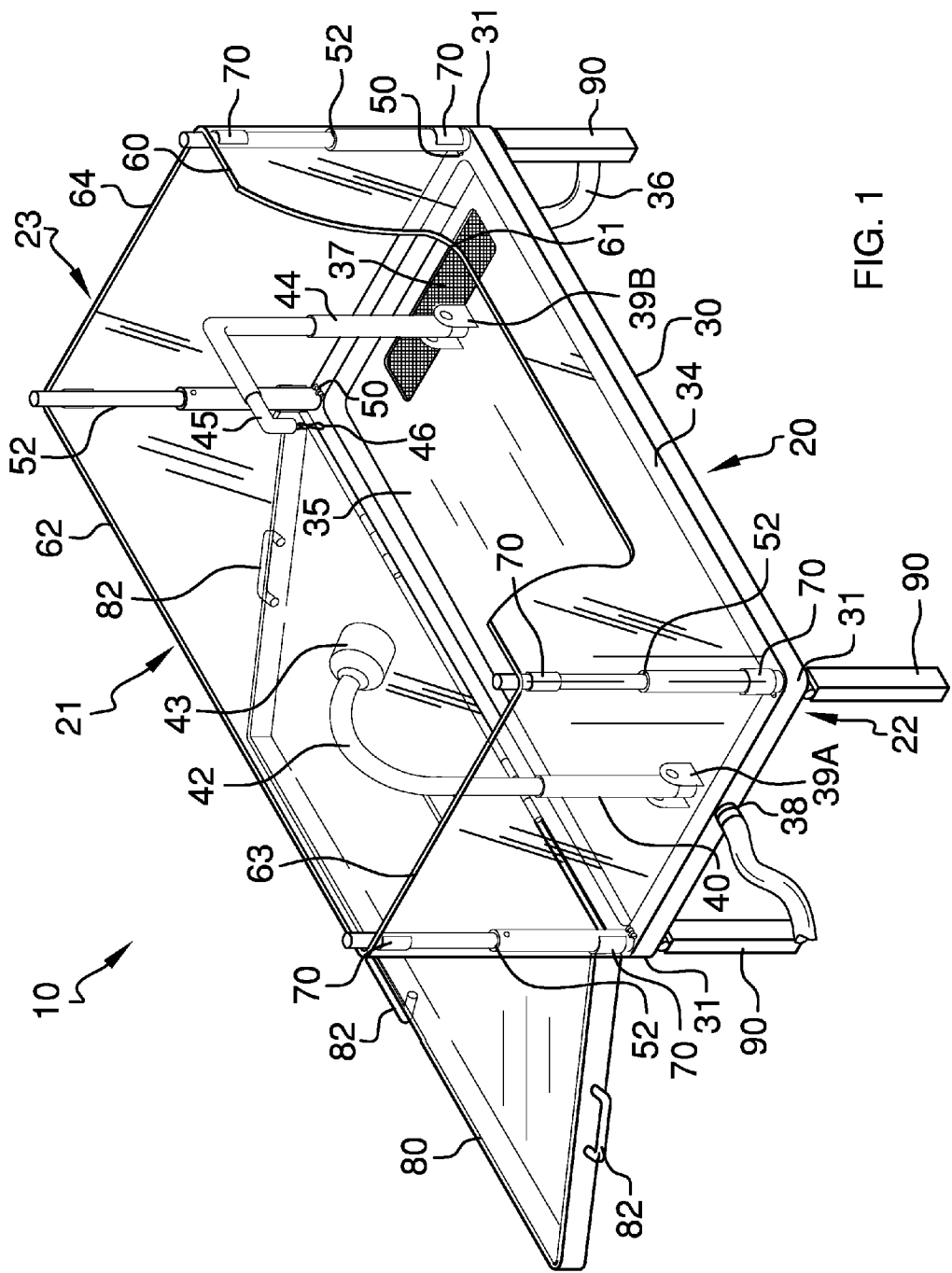
FIG. 1 is a front perspective view in the expanded fully usable state.

Referring to FIG. 1, the apparatus 10 comprises a first end 22 spaced apart from a second end 23 and a front 20 spaced apart from the rear 21. The rectangular base 30 has rounded corners 31. The elevated border 34 upwardly surrounds the base 30. A 90 degree hinge 50 is disposed atop each corner 31. Each 90 degree hinge 50 provides front 20 to rear 21 pivot. An extendable support 52 is affixed to each 90 degree hinge 50.

The pitched floor 35 is disposed downwardly on the base 30. The floor 35 is pitched toward the second end 23. The drain 36 is disposed in the floor 35 second end 23. The removable screen 37 is importantly disposed within the floor 35 atop the drain 36 so that animal hair is trapped prior to drain 36 entry and so that the screen 37 can be removed for cleaning.

Figure 3:
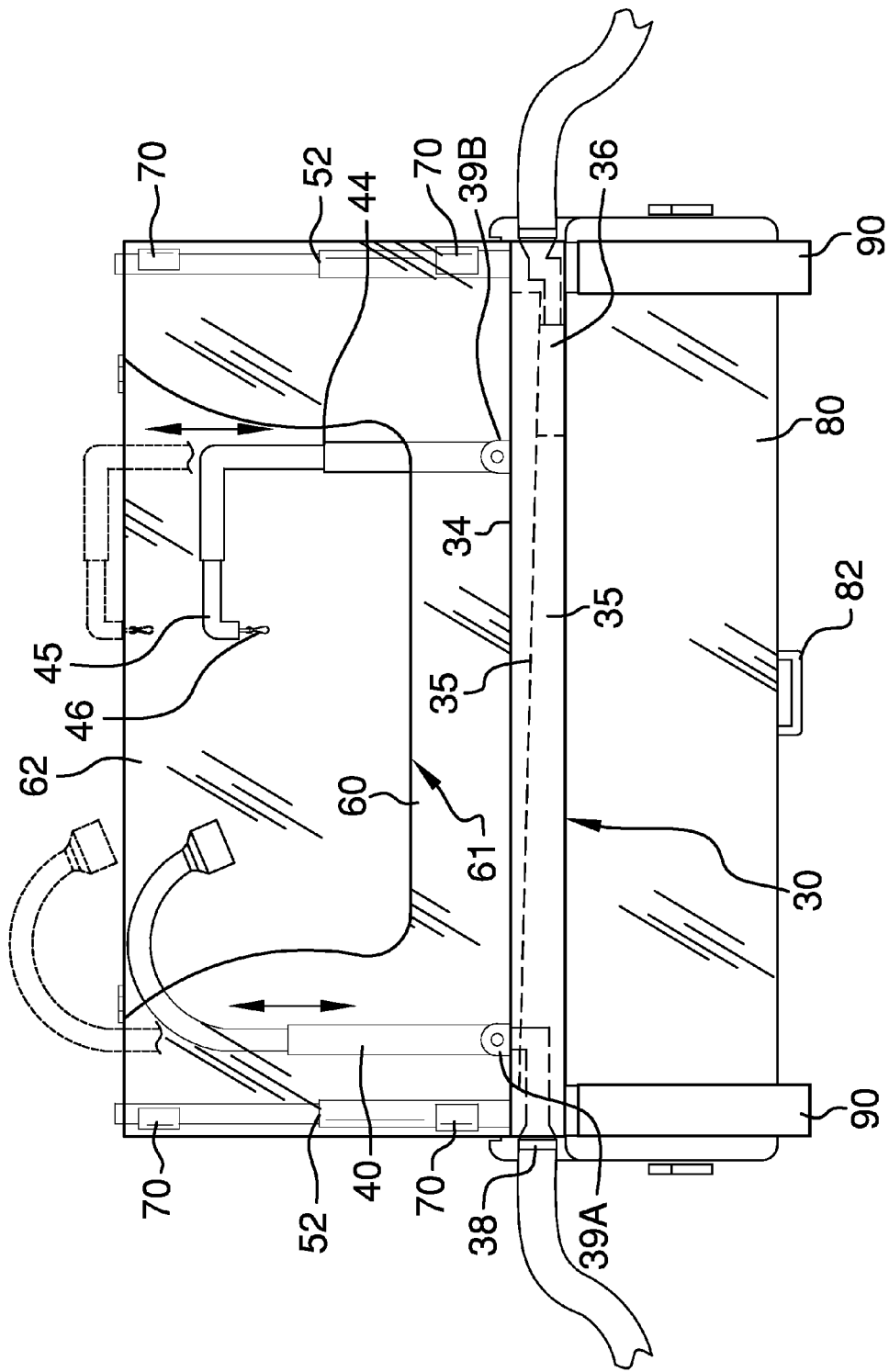
FIG. 3 is a front elevation view illustrating riser extendibility.

Continuing to refer to FIG. 1 and referring also to FIG. 3, the hose connection 38 is disposed within the floor 35 first end 22. The first swivel 39A is disposed upwardly from the floor 35 proximal to the first end 22. The second swivel 39B is disposed upwardly from the floor 35 proximal to the second end 23. The pivotal, extendable, rotatable riser 40 is extended upwardly from the first swivel 39A. The riser 40 is in communication with the hose connection 38. The flexible neck 42 is extended upwardly from the riser 40. The dispenser 43 is affixed to the flexible neck 42. The pivotal, extendable, rotatable L-shaped neck 44 is affixed upwardly to the second swivel 39B. The L-shaped insert 45 is rotateably and extendably inserted into the L-shaped neck 44. The hook 46 is disposed on the end of the L-shaped insert 45. The flexible rear wall 62 is removably disposed upwardly from the rear 21 border 34. The rear wall 62 is affixed to two of the extendable supports 52 via a plurality of rear wall 62 c-clips 70. The flexible front wall 60 is removably disposed upwardly from the front 20 border 34. The round-edged cutout 61 is disposed centrally within the front wall 60 and importantly allows a person to access the animal and bathing process within the walls, without, instead, having to bend over a wall. The front wall 60 is affixed to two of the extendable supports 52 via a plurality of front wall 60 c-clips 70.

The flexible first end wall 63 is removably disposed upwardly from the first end 22 border 34. The first end wall 63 is affixed to two of the extendable supports 52 via a plurality of first end wall 63 c-clips 70. The flexible second end wall 64 is removably disposed upwardly from the second end 23 border 34. The second end wall 64 is affixed to two of the extendable supports 52 via a plurality of second end wall 64 c-clips 70. The illustrated walls are transparent.

Figure 4:
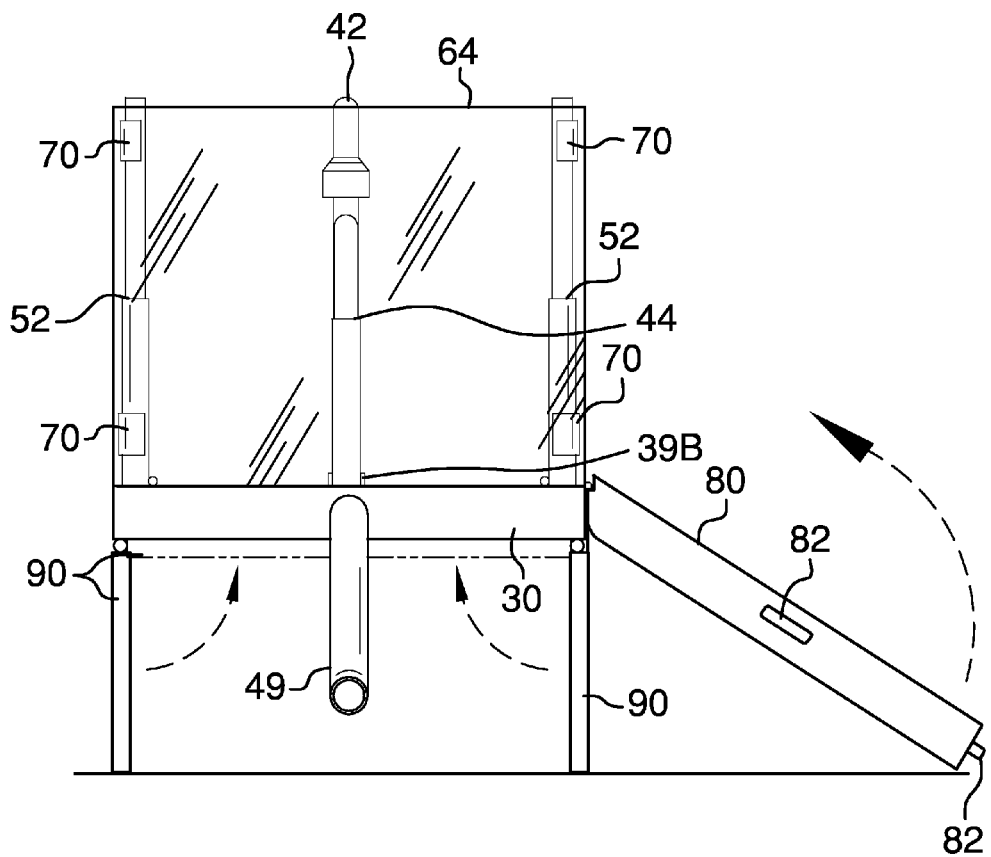
FIG. 4 is a second end elevation view of the expanded apparatus.
Figure 4A:
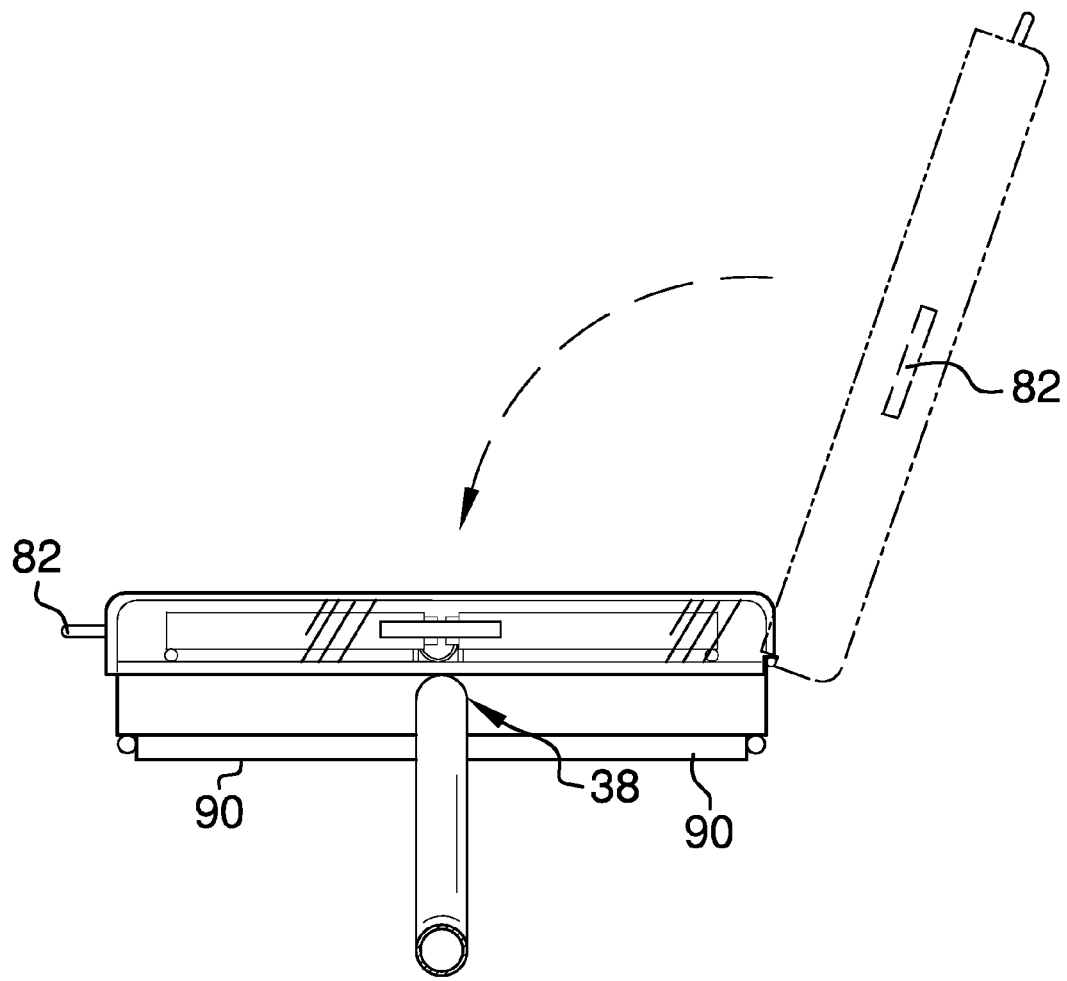
FIG. 4A first end elevation view of the collapsed apparatus.

Referring to FIGS. 4 and 4A, a folding leg 90 is affixed downwardly from each base 30 corner 31. The case 80 is hingedly affixed to the rear 21 border 34. The case 80 has an overlapping fit to the base 30.

Figure 2:
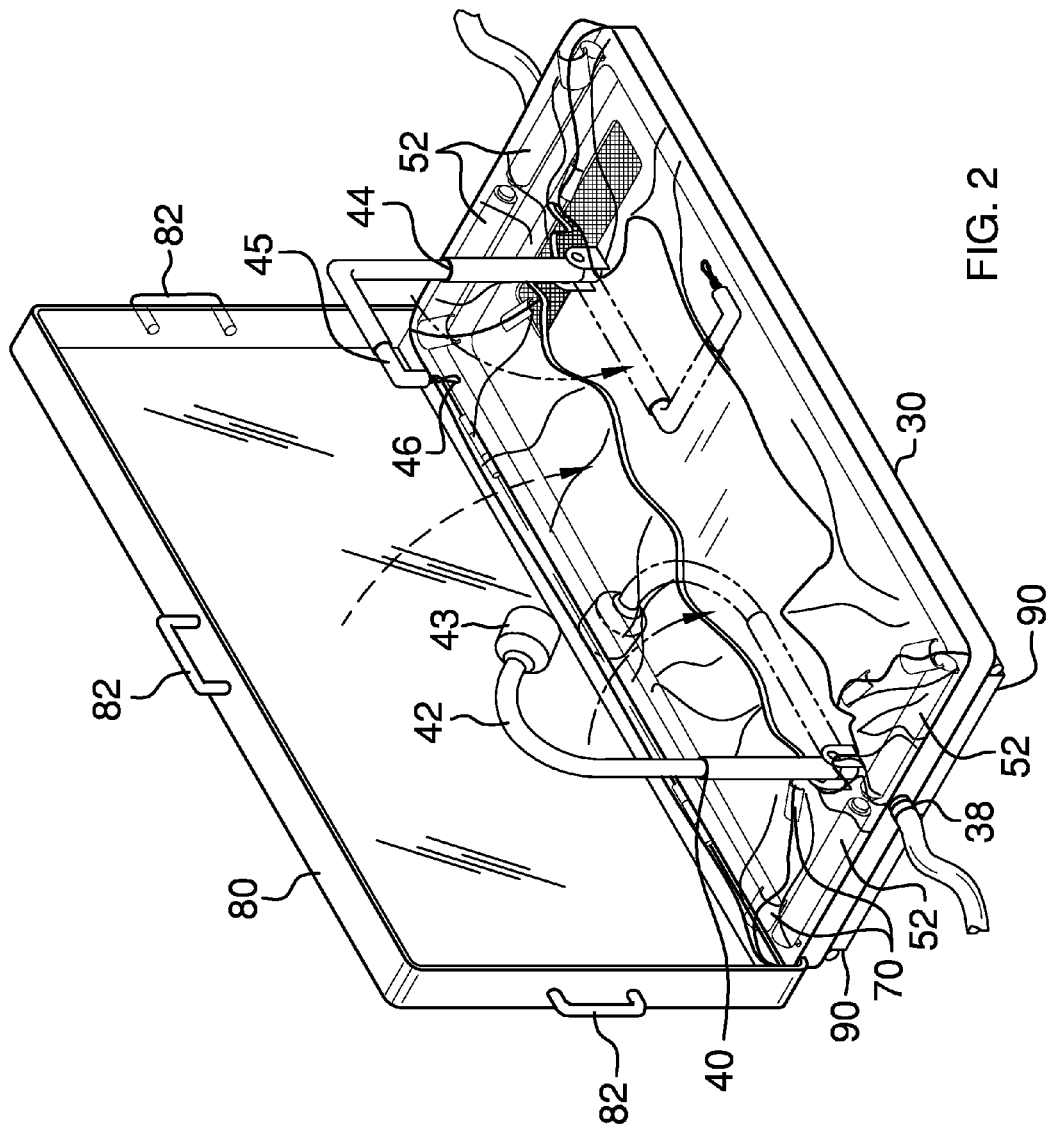
FIG. 2 is a front perspective view illustrating collapsibility and encasement.

Referring to FIG. 2, the walls are detached from the extendable support 52 c-clips 70 and thereby fitted above the base 30. The riser 40 and the L-shaped neck 44 are not yet folded downwardly into the base 30.

Referring to FIG. 4A, the walls, the riser, and the L-shaped neck 44 are fitted within and atop the base 30. The hingedly attached case 30 selectively fits in overlap over the base 30. The folding legs fold to meet the base 30 bottom. The handles 82 allow for carry of the apparatus 10 from either front 20 or from either end.

Figure 5:
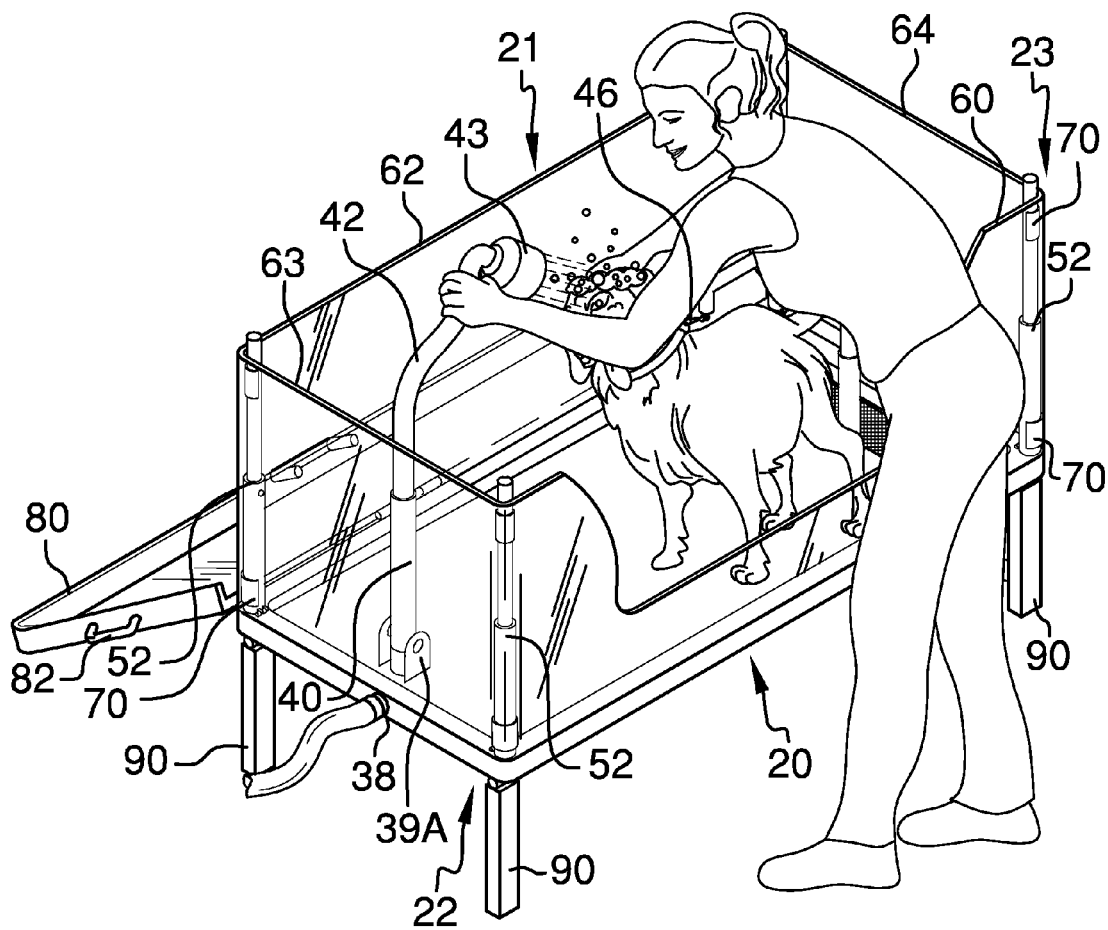
FIG. 5 is a front perspective view of the apparatus in use.

Referring to FIG. 5, the dog tender is able to bath the dog without bending or with only slight bending. The walls prevent splash from all but the round-edged cutout 61 from which the tender addresses the dog. Importantly, due to the cutout 61 and the base 30 elevation due to the folding legs 90, a tender can also bath an animal while in a sitting position upon a given elevated surface.

With respect to the above description then, it is to be realized that the optimum dimensional relationships for the parts of the animal bathing apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the animal bathing apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the animal bathing apparatus may be used.

Therefore, the foregoing is considered as illustrative only of the principles of the animal bathing apparatus. Further, since numerous modifications and changes will readily occur to those skilled in the art, it is not desired to limit the animal bathing apparatus to the exact construction and operation shown and described, and accordingly, all suitable modifications and equivalents may be resorted to, falling within the scope of the animal bathing apparatus.

What is claimed is:

1. An animal bathing apparatus comprising, in combination:

a first end spaced apart from a second end, a front spaced apart from a rear;

a rectangular base having rounded corners;

a elevated border upwardly surrounding the base;

a 90 degree hinge disposed atop each corner, each 90 degree hinge providing front to rear pivot;

an extendable support affixed to each 90 degree hinge;

a pitched floor disposed downwardly on the base, the floor pitched toward the second end;

a drain disposed in the floor second end;

a screen disposed within the floor atop the drain;

a hose connection disposed within the floor first end;

a first swivel disposed upwardly from the floor proximal to the first end;

a second swivel disposed upwardly from the floor proximal to the second end;

a pivotal, extendable, rotatable riser extended upwardly from the first swivel, the riser in communication with the hose connection;

a flexible neck extended from the riser;

a dispenser affixed to the flexible neck;

a pivotal, extendable, rotatable L-shaped neck affixed upwardly to the second swivel;

a L-shaped insert rotatable and extendable inserted into the L-shaped neck;

a hook disposed on an end of the L-shaped insert;

a rear wall removably disposed upwardly from the rear border, the rear wall affixed to two of the extendable supports via a plurality of rear wall c-clips;

a front wall removably disposed upwardly from the front border, the front wall affixed to two of the extendable supports via a plurality of front wall c-clips;

a round-edged cutout disposed centrally within the front wall;

a first end wall removably disposed upwardly from the first end border, the first end wall affixed to two of the extendable supports via a plurality of first end wall c-clips;

a second end wall removably disposed upwardly from the second end border, the second end wall affixed to two of the extendable supports via a plurality of second end wall c-clips;

a case hingedly affixed to the rear border, the case having an overlapping fit to the base;

whereby the base, walls, and swivels collapsibly fit within the case atop the base.

2. The apparatus according to claim 1 wherein the screen disposed within the floor is further removable.

3. The apparatus according to claim 1 further comprising a folding leg affixed downwardly from each base corner.

4. The apparatus according to claim 2 further comprising a folding leg affixed downwardly from each base corner.

5. The apparatus according to claim 1 wherein the walls are further transparent.

6. The apparatus according to claim 2 wherein the walls are further transparent.

7. The apparatus according to claim 3 wherein the walls are further transparent.

8. The apparatus according to claim 4 wherein the walls are further transparent.

9. An animal bathing apparatus comprising, in combination:

a first end spaced apart from a second end, a front spaced apart from a rear;

a rectangular base having rounded corners;

a elevated border upwardly surrounding the base;

a 90 degree hinge disposed atop each corner, each 90 degree hinge providing front to rear pivot;

an extendable support affixed to each 90 degree hinge;

a pitched floor disposed downwardly on the base, the floor pitched toward the second end;

a drain disposed in the floor second end;

a removable screen disposed within the floor atop the drain;

a hose connection disposed within the floor first end;

a first swivel disposed upwardly from the floor proximal to the first end;

a second swivel disposed upwardly from the floor proximal to the second end;

a pivotal, extendable, rotatable riser extended upwardly from the first swivel, the riser in communication with the hose connection;

a flexible neck extended from the riser;

a dispenser affixed to the flexible neck;

a pivotal, extendable, rotatable L-shaped neck affixed upwardly to the second swivel;

a L-shaped insert rotatable and extendable inserted into the L-shaped neck;

a hook disposed on an end of the L-shaped insert;

a flexible rear wall removably disposed upwardly from the rear border, the rear wall affixed to two of the extendable supports via a plurality of rear wall c-clips;

a flexible front wall removably disposed upwardly from the front border, the front wall affixed to two of the extendable supports via a plurality of front wall c-clips;

a round-edged cutout disposed centrally within the front wall;

a flexible first end wall removably disposed upwardly from the first end border, the first end wall affixed to two of the extendable supports via a plurality of first end wall c-clips;

a flexible second end wall removably disposed upwardly from the second end border, the second end wall affixed to two of the extendable supports via a plurality of second end wall c-clips;

a folding leg affixed downwardly from each base corner;

a case hingedly affixed to the rear border, the case having an overlapping fit to the base;

whereby the base, walls, and swivels collapsibly fit within the case atop the base.

10. The apparatus according to claim 9 wherein the walls are further transparent.

* * * * *